United States Patent Office 3,474,087
Patented Oct. 21, 1969

3,474,087
FAT SOLUBLE DERIVATIVE OF VITAMIN
$B_{12}$ AND THE PREPARATION THEREOF
Lee M. Harris, 255 E. 235th St., Euclid, Ohio 44123
No Drawing. Filed Oct. 24, 1966, Ser. No. 588,739
Int. Cl. A61k 25/02
U.S. Cl. 260—211.7         4 Claims

ABSTRACT OF THE DISCLOSURE

This invention comprises new derivatives of cobalamin in which certain higher fatty organic groups are attached to the cobalt atom. These compounds are useful as feed supplements and may be substituted for presently used forms of vitamin $B_{12}$.

---

This invention comprises new fat-soluble derivatives of cobalamin to be substituted for presently used forms of vitamin $B_{12}$. This invention also comprises methods for the preparation such novel derivatives.

The active form of vitamin $B_{12}$ in the body is coenzyme $B_{12}$, in which the nucleoside adenine is attached to the cobalamin cobalt atom above the plane of the cobalamin organic ring. Hydroxocobalamin is naturally injested in the body in animal products such as meat, fish, milk and eggs. It combines with a mucoprotein, present in the stomach and known only as intrinsic factor, to form a complex which is absorbed into the blood stream, primarily in the ileum, and converted to coenzyme $B_{12}$ in the human body primarily by the liver and kidneys where the coenzyme is stored.

Certain people lose the ability to absorb vitamin $B_{12}$ in the normal manner. For example, some people lose the intrinsic factor in their stomachs while some people have lost through surgery part or all of their stomachs or have had intestinal surgery. The diseases which result from the loss of vitamin $B_{12}$ in the human body include, for example, Addisonian pernicious anemia and other macrocytic anemias, all of which respond to treatment by parenteral injection, either subcutaneous, intramuscular or intravenous, with an aqueous solution of a form of vitamin $B_{12}$, primarily hydroxocobalamin or cyanocobalamin.

Dosage requirements for parenteral injections are dependent to some degree on the severity and duration of a patient's illness and his response to therapy. However, the human body under normal conditions only absorbs about 10 micrograms of vitamin $B_{12}$ per day. Consequently, dosages which are larger than this saturate the body's transport and conversion mechanisms resulting in simple excretion of the excess from the body. Efforts to provide a repository form of vitamin $B_{12}$ which could be stored in the body in a relatively inert form and then be slowly absorbed into the blood stream and converted over a period of one or more weeks have thus far met with at best limited success.

The primary object of this invention is to provide a derivative of vitamin $B_{12}$ which can be stored in the human body, which will absorb into the human system slowly and which can be converted to the active coenzyme.

Vitamin $B_{12}$ has also been used very successfully as a feed supplement, increasing the growth rate of animals, especially poultry and other nonruminant animals such as hogs. Another object of this invention is to provide a group of stable fat-soluble derivatives of cobalamin and a method for their preparation.

These objects as well as other objects which are apparent from this description are satisfied by this invention.

This invention comprises fatty-substituted cobalamins which are soluble in both n-butanol and water and in which the fatty portion is associated with the cobalt atom in the cobalamin. These compounds can be more simply defined as Co—R—cobalamins; this expression is intended to show that each fatty R group is associated with the cobalamin cobalt atom.

Any water-soluble form of cobalamin can be employed as a starting material, but of primary interest are hydroxocobalamin, cyanocobalamin, halogenocobalamins such as chlorocobalamin, nitrocobalamin, aquacobalamin and sulfocobalamin, all of which are known compounds. The cobalamines are prepared for conversion to the products of this invention by dissolving them in a minimum amount of water to achieve complete solution and then reducing the compounds with any reducing agent which does not interfere with the subsequent reaction. The preferred reducing agent is one which is soluble in the system, such as sodium borohydride, but more complicated agents, such as a slurry of zinc powder in an aqueous sodium acetate solution, can be used even though they introduce problems of separation from the finished product.

To achieve complete reduction of the cobalamin a 100% excess of the equivalent amount of reducing agent appears to be necessary. Preferably, a molar or equivalent weight excess of 5:1 or even 10:1 is employed, but beyond a certain excess which can be determined only by experience the conversion rate and conversion percentage are no longer significantly improved, the problems of separation increase and the reducing agent may be wasted.

Products of this invention can be obtained by reacting the reduced cobalamin with a fatty halide, preferably a iodide or fatty bromide, to produce cobalamin having attached to the cobalt atom a fatty R group. The simplest of these fatty compounds are the aliphatic hydrocarbon iodides and bromides, RI and RBr, respectively, containing from one to thirty carbon atoms. The preferred fatty iodides and bromides are those containing at least about 12 carbon atoms because the resulting derivatives are substantially more fat-soluble than derivatives made from similar iodides and bromides of lower molecular weight. The preferred fatty iodides and bromides generally contain no more than about 18 carbon atoms because similar iodides and bromides of high molecular weight are not readily available and the derivative prepared from such fatty halides are not significantly more fat soluble than derivatives prepared from fatty halides of 18 carbon atoms. The more preferred fatty iodides and fatty bromides contain at least one aliphatic carbon chain of from 12 to 18 carbon atoms, preferably free of branching.

Specific examples of suitable fatty compounds include methyl iodide, methyl bromide, ethyl iodide, ethyl bromide, 1-iodopropane, 1-iodobutane, 1-iodohexane, 1-bromohexane, 6-iodo-2-ethylhexane, 1-iododecane, 1-iodododecane, 1-bromododecane, 1-iodotetradecane, 12-bromo-3-ethyldodecane, 2-bromopentadecane, 1-iodohexadecane, 1-bromohexadecane, 4-bromohexadecane, 9-bromoheptadecane, 1-iodooctadecane, 1-bromooctadecane, 1-iodohexacosane, 1-bromooctene-3, 1-bromododecene-2, 15-bromopentadecene-7 and 1-iodooctadecene-9.

Other fatty compounds which can also be employed to make the derivatives of this invention are iodo and bromo-substituted esters such as, for example, glycerides such as trilaurin monoiodide, tricaprylin monoiodide, triolein monoiodide, tristearin monobromide and tripalmitin monoiodide; glycol esters such as ethylene laurate monoiodide and ethylene palmitate monoiodide; and simple esters such as ω-iodohexadecanoic acid methyl ester. The fatty compounds can also be such materials as ethers or ketones such as, for example, 3-iodopropyl isobutyl ether, 2-bromoethyl octyl ether, 8-iodooctyl octyl ether, 1-bromo-2-ethoxyhexadecane and 12-iodo-2-dodecanone. In such compounds it is preferable that the ratio of carbon atoms to oxygen atoms be at least 6:1. There is no theoretical maximum carbon to oxygen ratio, but as a practical matter the carbon to oxygen ratio should be no more than about 20:1.

The fatty iodide and bromide compounds are reacted with the reduced cobalamins by mixing the fatty compounds with the cobalamins in a molar excess of at least 10 molar percent, preferably a molar ratio of 2:1 or higher.

The reactions necessary to produce the compounds of this invention must be carried on in an oxygen-free atmosphere in essentially no light. The products are also light senstive. For example, the Co-hexadecylcobalamin prepared in Example I below reverts to a hexadecane derivative, probably an alcohol or acid, and hydroxocobalamin after exposure to intense light for one hour.

The compounds of this invention are designed to take advantage of the known fact that fat-soluble substances are retained by the body for longer periods than analogous water-soluble substances. The exact mechanism for the operation of the subject compounds in the body is unknown, but the compounds are retained for significant periods in the body and are therapeutically active after such periods.

The compounds of this invention can be introduced into an animal system by parenteral injections, either subcutaneous, intramuscular or intravenous. It is believed that these compounds can also be introduced orally and ingested by pinocytosis.

The following examples are merely illustrative and are not intended to limit this invention which is properly delineated in the claims. All experiments are done in essentially light-free, oxygen-free systems.

EXAMPLE I

A closed system is flushed with nitrogen to remove all oxygen. Sodium borohydride ($NaB_2H_2$) and hydroxocobalamin in a saturated aqueous solution are mixed together in a molar ratio of only 5:1 until the color of the system changes, in this case from red to greenish-brown in a period of about 10 minutes. 1-iodohexadecane is then added to the system with vigorous stirring in a molar ratio of about 2 moles of 1-iodohexadecane per mol of hydroxocobalamin. After about one hour the product is poured into a three-fold volume excess of water-saturated phenol. The desired product with some of the excess 1-iodohexadecane goes into the pehnol phase, and the water phase is discarded. The phenol phase is washed thoroughly with water which is discarded. A volume of ethyl ether equal to the volume of the phenol phase is mixed thoroughly with the phenol phase. The phenol and any residual iodides are dissolved into the ether phase leaving the desired product and residual water in a separate phase which can be further purified by repeating the last step or the last two steps. The product is then isolated by evaporating the water leaving a red solid having the appearance of hard soap. The product is Co-hexadecylcobalamin as identified by thin layer chromatography and paper electrophoresis in 0.1 N acetic acid. The product is soluble in butanol and reverts to hydroxocobalamin and a hexadecane compound after 1 hour exposure to intense light.

EXAMPLE II

When chlorocobalamin, cyanocobalamin, nitrocobalamin, aquacobalamin, and sulfocobalamin are each substituted mol per mol for the hydroxocobalamin in the process of Example I, the same product is obtained.

EXAMPLE III

When 1-bromohexadecane is substituted mol per mol for the 1-iodohexadecane in the process of Example I, the same product is obtained.

EXAMPLE IV

When each of the following iodides is substituted mol per mol for the 1-iodohexadecane in the process of Example 1, warming the system when necessary to keep it fluid, the corresponding derivatives of cobalamin are obtained:

Methyl iodide
Ethyl iodide
1-iodobutane
1-iododecane
1-iodododecane
12-bromo-3-ethyldodecane
2-bromopentadecane
1-iodooctadecane
1-iodohexacosane
1-bromododecene-2
1-iodooctadecane-9

EXAMPLE V

When tripalmitin monoiodide is substituted mol per mol for the 1-iodohexadecane in the process of Example I and the system is heated (to about 50° C.) to melt the tripalmitin monoiodide to make it operative in the process, the corresponding tripalmitin derivative of cobalamin is obtained.

EXAMPLE VI

When 1-bromo-2-ethoxyhexadecane is substituted mol per mol for the 1-iodohexadecane in the process of Example I, Co-2-ethoxyhexadecylcobalamin is obtained.

What I claim is:

1. A composition of matter comprising cobalamin having attached to the cobalt atom a monovalent aliphatic organic radical containing from 12 to 57 carbon atoms and selected from the group consisting of hydrocarbon, ether, ester and ketone radicals, the ratio of carbon to oxygen being at least about 6:1.

2. The composition of claim 1 wherein the monovalent aliphatic organic group is selected from the class consisting of hydrocarbon groups, hydrocarbon ether groups and hydrocarbon ketone groups, said groups containing no more than thirty carbon atoms, and hydrocarbon ester groups in which each hydrocarbon chain contains no more than eighteen carbon atoms.

3. The composition of claim 2 wherein the monovalent aliphatic organic group is a hydrocarbon group containing from 12 to 18 carbon atoms.

4. The composition of claim 3 wherein the hydrocarbon group is essentially free of branching.

References Cited

UNITED STATES PATENTS 3,213,082   10/1965   Smith et al.

OTHER REFERENCES

Hill et al.: Chem. and Industry, Feb. 1, 1964, p. 197.

LEWIS GOTTS, Primary Examiner

JOHNNIE R. BROWN, Assistant Examiner

U.S. Cl. X.R.

99—2, 11; 424—201